US011937672B2

(12) United States Patent
Younger

(10) Patent No.: US 11,937,672 B2
(45) Date of Patent: Mar. 26, 2024

(54) FOOT FOR MEDICAL MOBILITY DEVICE

(71) Applicant: Mobility Designed, Inc., Kansas City, MO (US)

(72) Inventor: Max Jefferies Younger, Roeland Park, KS (US)

(73) Assignee: Mobility Designed, Inc., Kansas City, MO (US)

( * ) Notice: Subject to any disclaimer, the term of this patent is extended or adjusted under 35 U.S.C. 154(b) by 3 days.

(21) Appl. No.: 17/448,785

(22) Filed: Sep. 24, 2021

(65) Prior Publication Data

US 2022/0095754 A1 Mar. 31, 2022

Related U.S. Application Data

(60) Provisional application No. 63/083,656, filed on Sep. 25, 2020.

(51) Int. Cl.
*A45B 9/04* (2006.01)
*A61H 3/02* (2006.01)

(52) U.S. Cl.
CPC ............. *A45B 9/04* (2013.01); *A61H 3/0288* (2013.01)

(58) Field of Classification Search
CPC ................................ A45B 9/04; A61H 3/0288
See application file for complete search history.

(56) References Cited

U.S. PATENT DOCUMENTS

| | | | | |
|---|---|---|---|---|
| 909,827 A * | 1/1909 | Seibert | A61H 3/0288 | 190/18 R |
| 1,438,883 A * | 12/1922 | Youngren | A61H 3/0277 | 292/338 |
| 2,453,742 A * | 11/1948 | Bowen | A61H 3/0288 | 403/220 |
| 2,857,925 A * | 10/1958 | Higginbotham | A61H 3/0288 | 135/86 |
| 9,955,760 B2 * | 5/2018 | Chen | A61H 3/0277 | |

(Continued)

FOREIGN PATENT DOCUMENTS

| | | | |
|---|---|---|---|
| CN | 204599617 U | 9/2015 | |
| DE | 29719745 U1 * | 2/1998 | A45B 9/04 |

(Continued)

OTHER PUBLICATIONS

Applicant Admitted Prior Art, Nike Air Max 270 Men's Shoes, https://www.nike.com/t/air-max-270-mens-shoes-KkLcGR/AH8050-100, 6 pages.

(Continued)

*Primary Examiner* — Noah Chandler Hawk
(74) *Attorney, Agent, or Firm* — AVEK IP, LLC

(57) ABSTRACT

A foot for a medical mobility device includes an upper portion, a traction surface, and a cushion ring. The upper portion has an opening at a first end for receiving an end of a medical mobility device and an upper portion post extending from a second end away from the opening. The traction surface has a core element that includes a cylindrical post extending upwardly from the traction surface. The upper portion is secured atop the core element. The cylindrical post is adhered to the upper portion post thereby defining a space between the upper portion and the traction surface, and the cushion ring is positioned in the space.

20 Claims, 12 Drawing Sheets

(56) References Cited

U.S. PATENT DOCUMENTS

| | | | | |
|---|---|---|---|---|
| 2010/0307549 A1* | 12/2010 | Goodwin | A45B 9/04 135/82 |
| 2015/0374082 A1* | 12/2015 | Austin | A45B 9/04 135/77 |
| 2016/0095397 A1* | 4/2016 | Crowhurst | A45B 9/00 135/77 |
| 2017/0312164 A1 | 11/2017 | Dollarhide | |
| 2020/0146924 A1 | 5/2020 | Younger | |

FOREIGN PATENT DOCUMENTS

| | | |
|---|---|---|
| KR | 101247402 B1 | 3/2013 |
| WO | 2006047413 A3 | 8/2006 |

OTHER PUBLICATIONS

International Search Report and Written Opinion, dated Jan. 10, 2022, 10 pages, issued in PCT Application No. PCT/US2021/081588.

* cited by examiner

FOOT FOR MEDICAL MOBILITY DEVICE

CROSS-REFERENCE TO RELATED APPLICATIONS

This application claims the benefit of priority of U.S. Provisional Patent Application No. 63/083,656, filed Sep. 25, 2020, the entire disclosure of which is incorporated herein by reference.

FIELD OF THE INVENTION

The invention is directed to a foot for medical mobility devices. More specifically, this invention is directed to a foot for medical mobility devices that provides superior articulation and comfort to users of medical mobility devices as compared to prior art feet.

SUMMARY

The following presents a simplified summary of the invention in order to provide a basic understand of some aspects of the invention. This summary is not an extensive overview of the invention. It is not intended to identify critical elements of the invention or to limit the scope of the invention. Its sole purpose is to present some concepts of the invention in a simplified form as a prelude to the more detailed description presented below.

In one embodiment, a foot for a medical mobility device includes an upper portion, a traction surface, and a cushion ring. The upper portion has an opening at a first end for receiving an end of a medical mobility device and an upper portion post extending from a second end away from the opening. The traction surface has a core element comprising a cylindrical post extending upwardly from the traction surface. The upper portion is secured atop the core element. The cylindrical post is adhered to the upper portion post thereby defining a space between the upper portion and the traction surface, and the cushion ring is positioned in the space.

In another embodiment, a cushion system for a medical mobility device has an upper portion, comprising an opening for receiving an end of a medical mobility device; a traction surface; and an air-an air-filled cushion secured between the upper portion and the bottom portion.

In still another embodiment, a cushion system for a medical mobility device includes an upper portion, a traction surface, and a cushion. The upper portion has an opening for receiving an end of a medical mobility device. The cushion is positioned between the upper portion and the traction surface. And the traction surface and the upper portion are secured at opposing sides of the cushion.

DETAILED DESCRIPTION

Figure 1:
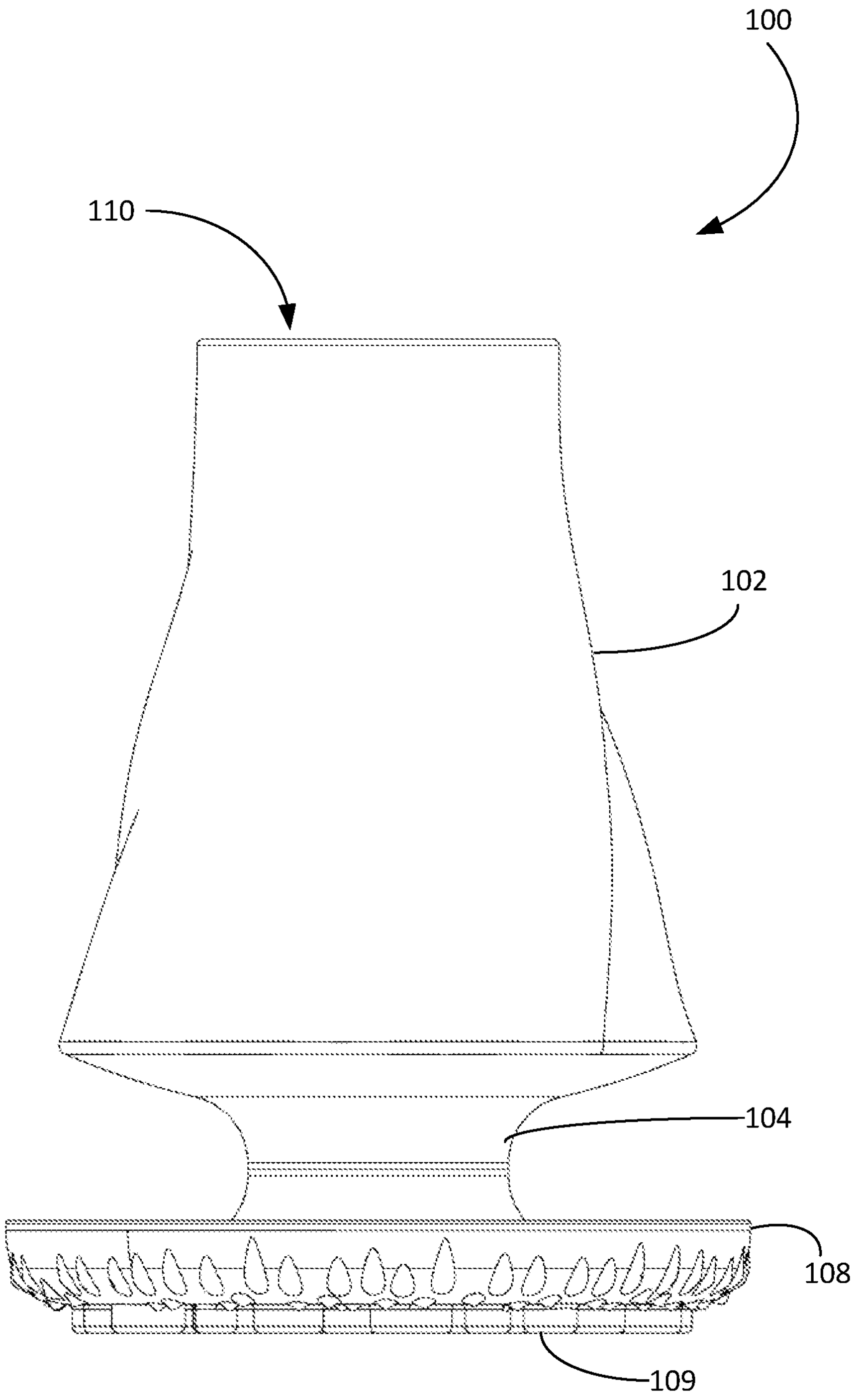
FIG. 1 is a perspective view of a foot for a medical mobility device according to embodiments of the invention.

Medical mobility devices, such as crutches, walkers, canes, et cetera, typically include a rubber foot at the end to provide friction against the ground while in use. Generally, the rubber foot is a hollowed cap that simply fits over the end of the leg of the mobility device. When the foot wears out, the user can simply replace the foot by removing it from the end of the mobility device and slipping a new foot over the end. These caps are inexpensive and provide traction. However, the caps provide limited further utility, if any.

Embodiments of a foot for a medical mobility device that is flexible such that the foot aids the user in walking, and further supports the balance of the user, are described herein. As described in greater detail herein, the novel foot for medical mobility devices is specially designed to provide cushioned support and superior flexibility as compared to prior art feet.

Referring to FIGS. 1-5, the foot 100 generally includes an upper portion 102, a core element 104, a cushion 106, and a base or traction surface 108. The upper portion 102 may be generally similar to a traditional foot for a mobility device, in that the upper portion 102 has an opening 110 that is configured to snugly fit around the end of the mobility device. As most clearly seen in FIG. 5, the opening 110 may extend partially or fully through the upper portion 102. In embodiments, the opening 110 has a plurality of ribs 112 that provides friction between the upper portion 102 and the end of the mobility device.

Figure 5:
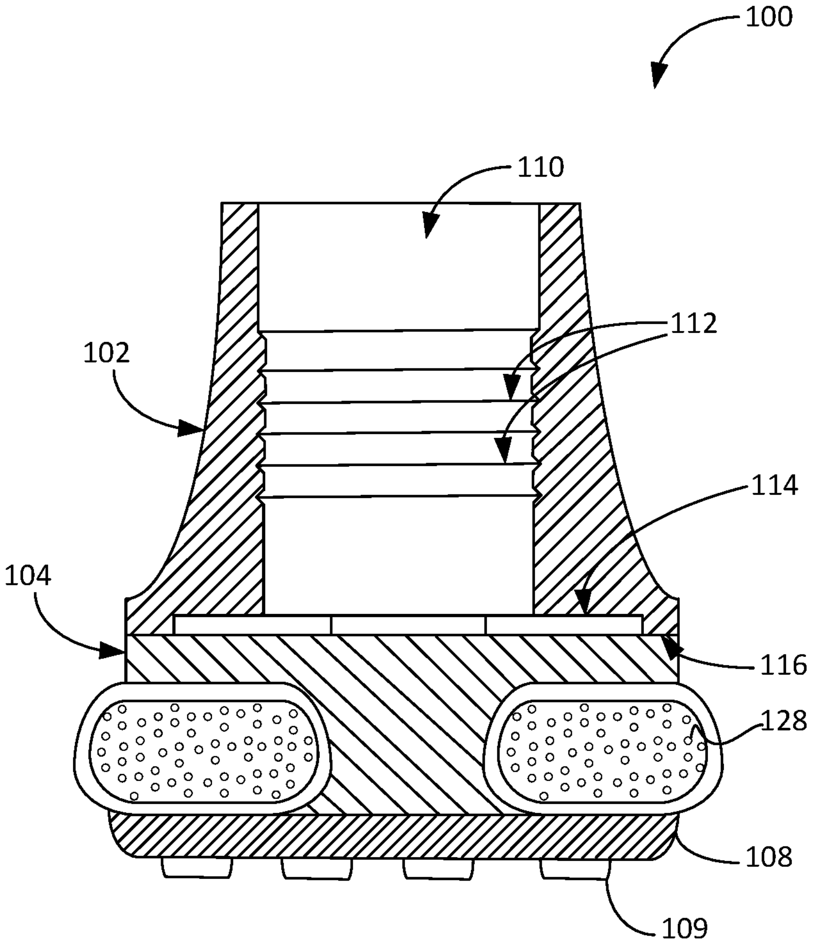
FIG. 5 is a section view of a foot for a medical mobility device according to embodiments of the invention.
Figure 6:
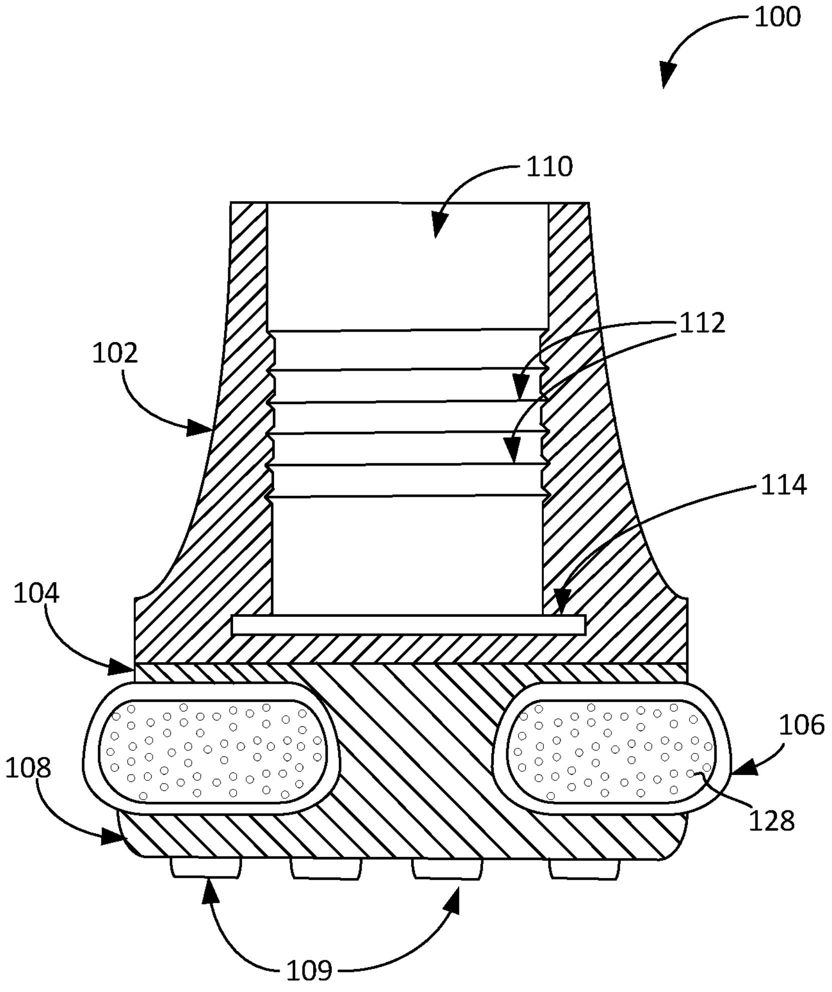
FIG. 6 is a section view of a foot for a medical mobility device according to embodiments of the invention.

A washer 114, plate, or similar type of apparatus (generally referred to herein as a washer) may optionally be positioned near the bottom of the opening 110 to provide a stop for the end of the tube of mobility device from pushing through the foot 100. In other words, the washer 114 is configured to prevent the end of the mobility device from extending through the bottom of the upper portion 102. A circumference of the washer 114 may be sized commensurate with the perimeter of the opening 110. In embodiments, as shown in FIG. 5, the washer 114 may have a circumference that is greater than that of the opening 110. The upper portion 102 may be molded around the washer 114 (see, e.g., FIG. 6), or the washer 114 may be otherwise secured to or within the upper portion 102. In some embodiments, the washer 114 may be positioned between the upper portion 102 and the core element 104 as described in greater detail below. Of course, the washer 114 need not be circular in shape.

The upper portion may be fashioned out of any appropriate material, such as plastic or rubber (e.g., natural or synthetic).

Figure 4:
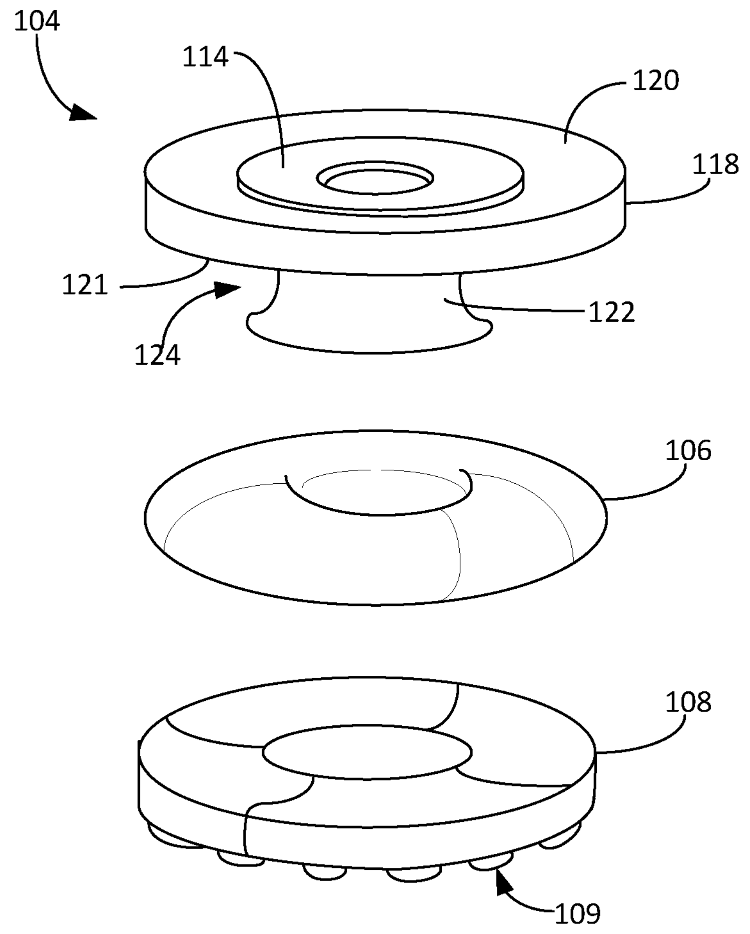
FIG. 4 is an exploded view of a core element of a foot for a medical mobility device according to embodiments of the invention.

The upper portion 102 is situated adjacent the core element 104. Referring now to FIG. 4, the core element 104 may include a plate 118 having a substantially planar top surface 120 with a circumference that may, but need not, be generally equal to the circumference of a bottom surface 116 (FIG. 5) of the upper portion 102. As noted above, the washer 114 may be positioned atop the top surface 120 of the core element 104 to provide a secure and durable surface such that the crutch end does not push through the upper portion 102 and/or the core element 104.

The upper portion 102 may be secured to the top surface 120 of the plate 118. In embodiments, an adhesive may be used to fix the upper portion 102 to the core element 104. In other embodiments, the core element 104 may be co-molded to the upper portion 102. In further embodiments, the upper portion 102 and the core element 104 may formed as a unitary structure. In still further embodiments, the upper portion 102 may be mechanically coupled (e.g., screwed) onto the core element 104. Additional layers (e.g., foam or other material) may be disposed between the upper portion 102 and the core element 104.

In embodiments, the upper portion 102 may extend over and/or around the plate 118. In still further embodiments, particularly where the upper portion 102 and the core element 104 are formed as a unitary structure, the core element 104 may be entirely devoid of a plate 118, and the post 122 may simply extend from a bottom of the upper portion 102.

Figure 7:
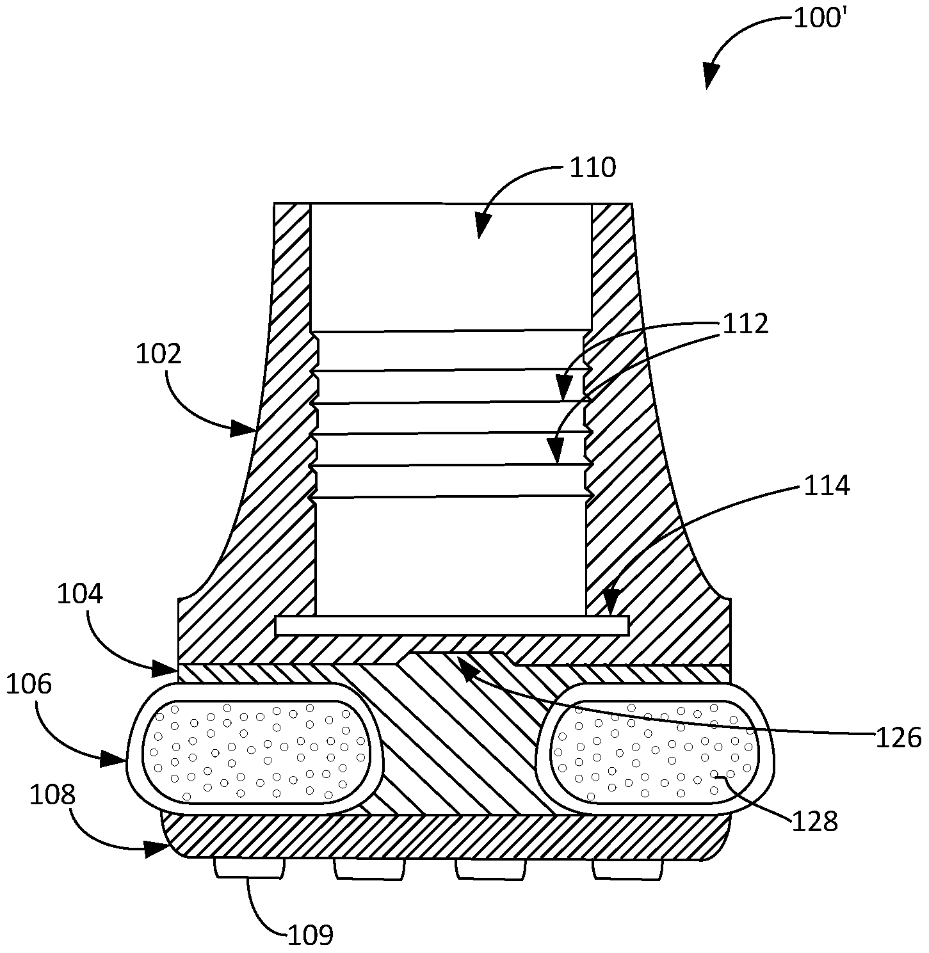
FIG. 7 is a section view of a foot for a medical mobility device according to embodiments of the invention.

As shown in FIG. 7, which illustrates a foot 100' that is substantially similar to the foot 100 in FIG. 5, the core element 104 has a projection 126 that extends upwardly to provide additional surface area for securing the upper portion 102 to the core element 104. Although not necessary, the projection 126 may have threads or other coupling mechanisms such as teeth, O-rings, et cetera, and the upper portion 102 may have corresponding coupling mechanisms, for further securing the upper portion 102 to the core element 104.

The core element 104 further includes a generally cylindrical post 122 extending downward from a bottom surface 121 of the plate 118. An outer wall of the post may have a generally concave shape such that an area 124 is formed between the post 122 and the bottom surface 121 of the plate 118. The post 122 may, but need not, include a hollow center.

To support the user while providing the necessary flexibility, the core element 104 may be made of a foam, plastic, polymer material such as ethylene vinyl acetate (EVA) or natural rubber, for example. However, any material that provides some flexibility while still providing the strength necessary to support the user may be used. In embodiments, the core element 104 may be customized. For example, the material may be colored according to a user's preferences.

The core element 104, through the post 122, is attached to the traction surface 108. The core element 104 may be adhered to the traction surface 108, co-molded with the traction surface 108 (e.g., FIG. 6), co-formed with the traction surface 108, or otherwise formed and secured to the traction surface 108 according to the knowledge of those skilled in the art. In embodiments, the core element 104 may be mechanically coupled (e.g., screwed, snapped, etc.) onto the base 108. Additional layers (e.g., foam) may be disposed between the core element 104 and the base 108.

An underside of the traction surface 108, or the side that touches the ground, is equipped with a tread pattern 109 for dispersing water away from the foot 100 and providing further traction for the user of the mobility device.

The traction surface 108 may be made of any appropriate material, including but not limited to rubber, polyurethane, and/or similar materials.

Figure 2:
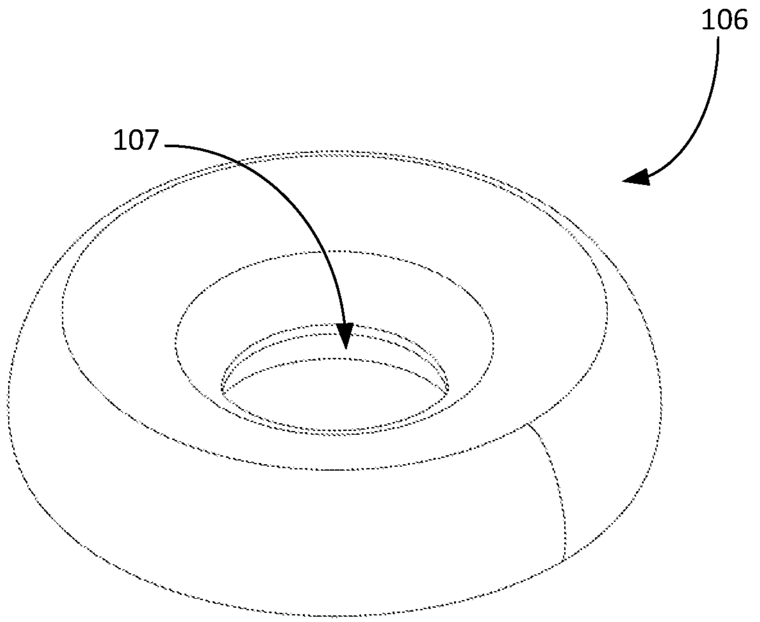
FIG. 2 is a perspective view of a cushion for a foot for a medical mobility device.
Figure 3:
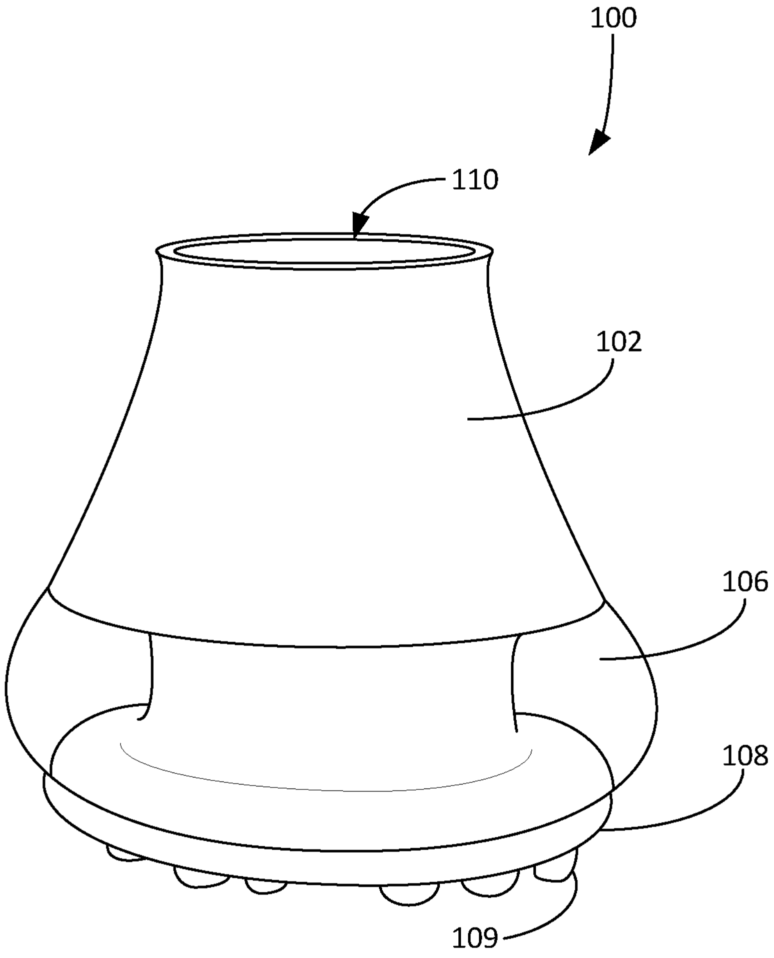
FIG. 3 is a perspective view of a foot for a medical mobility device according to embodiments of the invention.

In embodiments, a cushion 106 is positioned in the space 124 between the post 122, the bottom surface of the plate 121, and the traction surface 108. The cushion 106 may be, for example, a clear polymer material such as TPU. Of course, the cushion 106 need not be clear. In embodiments, the cushion 106 may be formed as a ring and may be hollow (e.g., as shown in FIG. 2), thereby forming a sealable bladder, and air, nitrogen, or any other gas 128 may fill the ring. The post 122 may extend through an opening 107 in the cushion 106 to hold the cushion 106 in place. In embodiments, the cushion 106 may be further adhered to the core element 104 and/or the traction surface 108.

Figure 9:
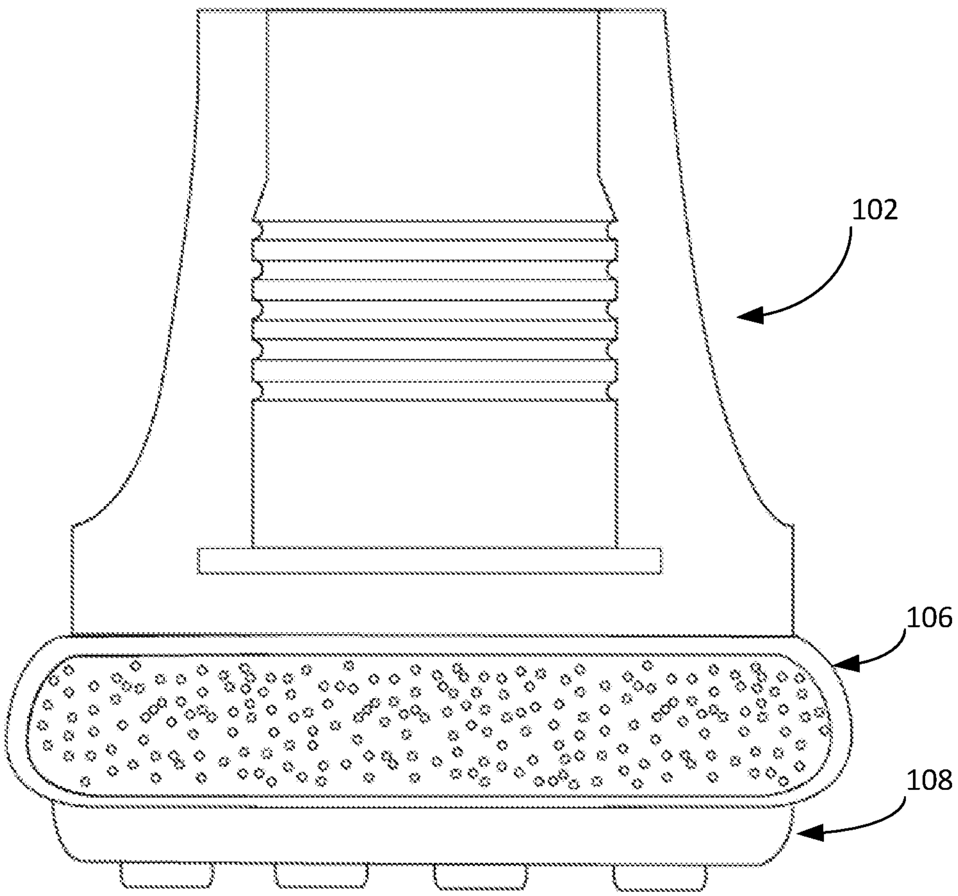
FIG. 9 is a section view of a foot for a medical mobility device according to embodiments of the invention.
Figure 10:
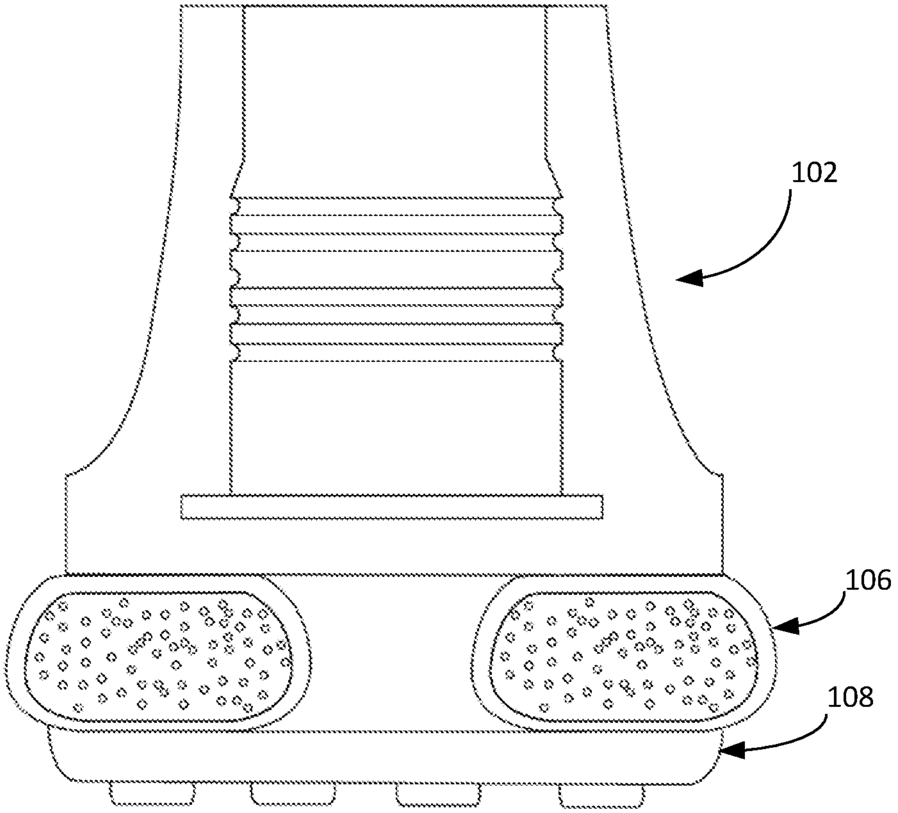
FIG. 10 is a section view of a foot for a medical mobility device according to embodiments of the invention.
Figure 11:
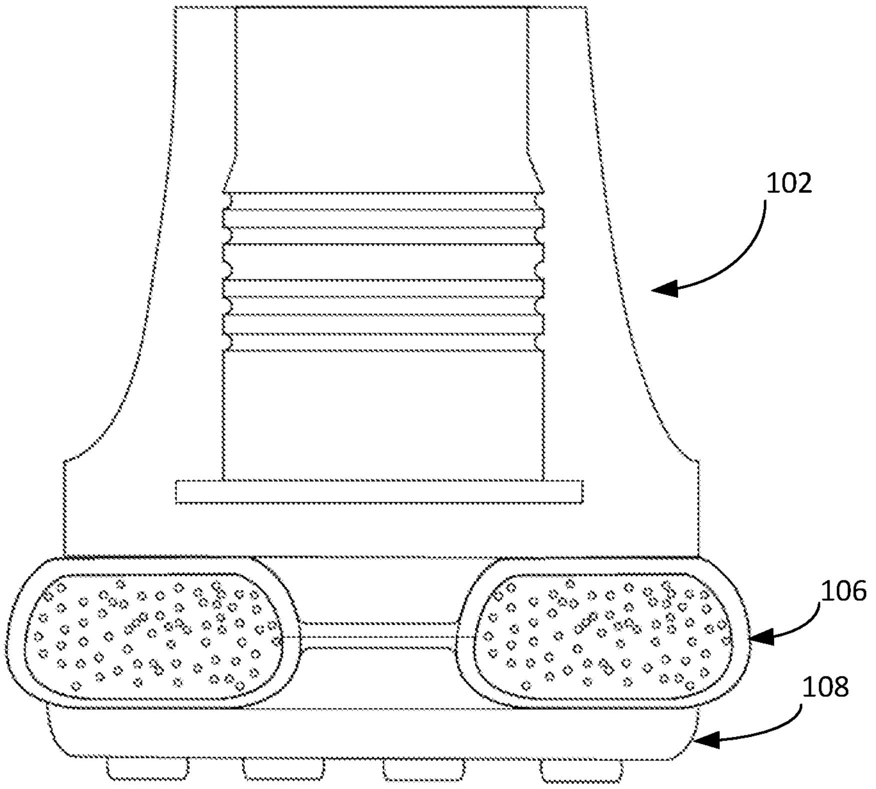
FIG. 11 is a section view of a foot for a medical mobility device according to embodiments of the invention.
Figure 12:
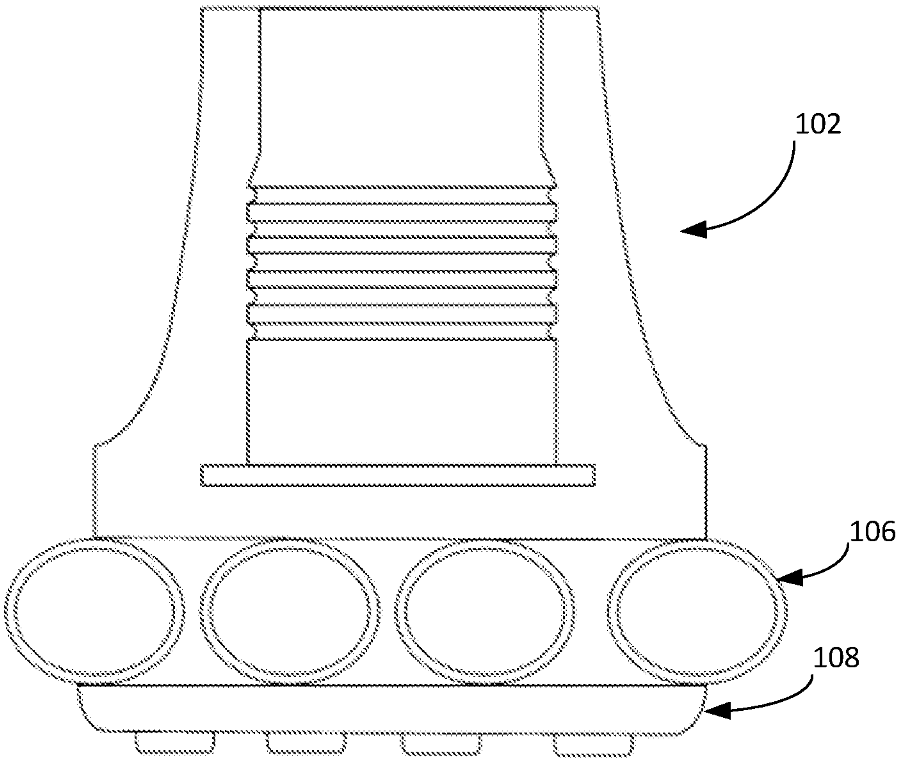
FIG. 12 is a section view of a foot for a medical mobility device according to embodiments of the invention.

It shall be understood that the cushion 106 does not necessarily need to be ring-shaped, or hollow. In essence, the cushion 106 is a flexible weight support positioned between the traction 108 surface and the upper part 102 of the foot 100. FIGS. 9-12 illustrate alternative embodiments of a cushion 106. In embodiments, the foot 100 may be devoid of a core element 104. In FIG. 9, the cushion 106 is configured as a disc devoid of a central opening and is disposed between the traction surface 108 and the upper part 102 of the foot 100 to provide flexible support. And as noted above, the cushion 106 need not be hollow; instead, the cushion 106 may be any flexible material, such as a foam. Additionally, it shall be understood that the cushion 106 may include more than one layer, and in embodiments, one or more of the layers may be configured as a sealable bladder for holding air while another one or more of the layers may be a different material, such as a foam. The upper part 102 and the traction surface 108 may be adhered to opposing sides of the cushion 106. In FIG. 10, the cushion 106 is configured as a ring, and the upper portion 102 and the traction surface 108 are simply disposed on opposing sides of the cushion 106. Of course, the cushion 106 may be adhered to the upper portion 102 and the traction surface 108. In FIG. 11, the cushion 106 is generally ring-shaped, but the center of the ring is enclosed. Here too, the cushion 106 is situation between the upper portion 102 and the traction surface 108, and may be adhered thereto. In further embodiments, such as illustrated in FIG. 12, the cushion 106 is configured as one or more springs (e.g., material with inherent compressibility and expansion properties and/or components designed to have compressibility and expansion properties) that are disposed within the area 124.

In still further embodiments, the cushion 106 may be formed as part of the core element 104. In other words, the cushion 106 may be formed by simply closing off the area 124 between the post 122, the plate 118 (or the upper part 102, as the case may be) and the traction surface 108. In such a case, the cushion 106 is not a separate component.

In use, the cushion 106 helps to support the user as they move while utilizing the mobility device, and provides flexible cushioning to the user. Further, the cushion 106 may help to prevent the foot 100 from getting caught on the undersides of low surfaces, such as in a doorway where, without the cushion 106, the traction surface 108 may become caught and leveraged against a low overhang, e.g., of a door.

Figure 8:
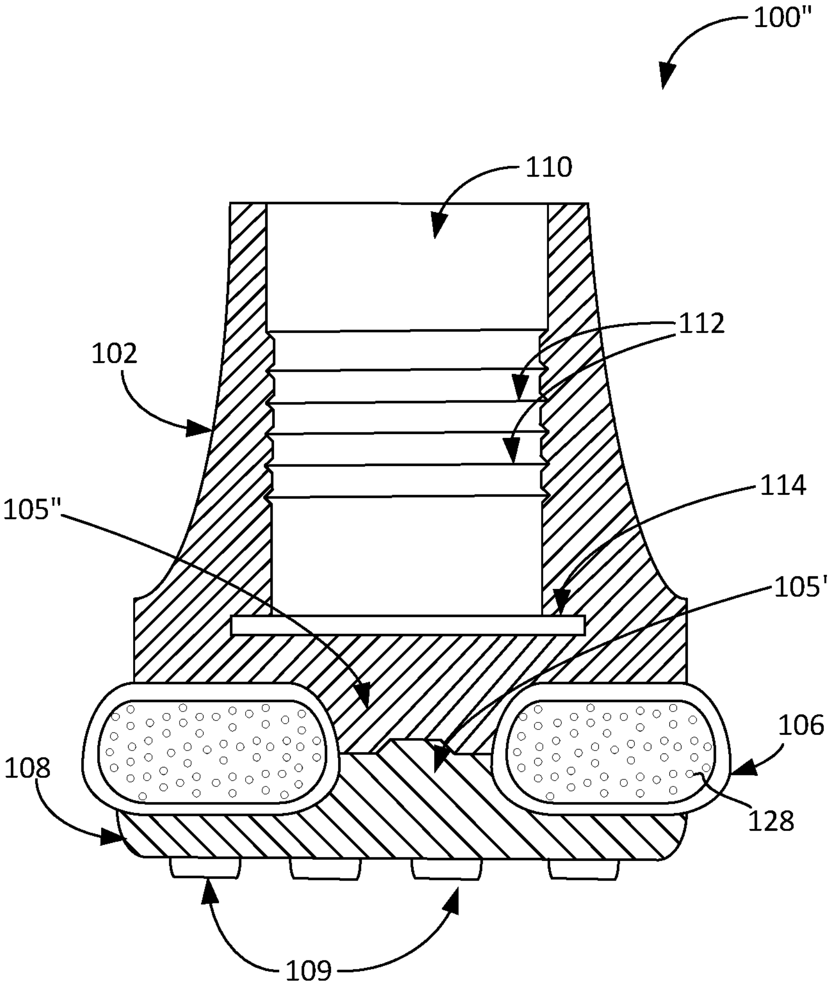
FIG. 8 is a section view of a foot for a medical mobility device according to embodiments of the invention.

FIG. 8 shows an alternative embodiment of a foot 100" that is substantially similar to the foot 100 in FIG. 5 and the foot 100' in FIG. 7 except as shown as described. Here, the traction surface 108 has a first projection 105' extending upwardly therefrom. The upper portion 102 has a second projection 105" extending downwardly therefrom. The first and second projections 105', 105" may have corresponding structure (e.g., male and female structure) for securing the respective projections 105' and 105" together. Together, the projections 105' and 105" may form a structure similar to the post 122. As with the post 122, the projections 105' and 105" may have concave outer walls, and, when secured together, define an area 124 between the upper portion 102 and the traction surface 108 for receiving the cushion 106. Additional material (e.g., foam) may be disposed between the upper portion 102 and the traction surface 108.

Many different arrangements of the various components depicted, as well as components not shown, are possible without departing from the spirit and scope of the invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the invention. Further, it will be understood that certain features and subcombinations are of utility and may be employed within the scope of the disclosure. Further, various steps set forth herein may be carried out in orders that differ from those set forth herein without departing from the scope of the claimed methods. The specification shall not be restricted to the above embodiments. Any units of measurements provided herein are exemplary only and are not meant to specifically define the dimensions of the system. Other dimensions may be appropriate or desirable.

The invention claimed is:

1. A foot for a medical mobility device, comprising:

an upper portion, comprising an opening at a first end for receiving an end of a medical mobility device, and an upper portion post extending from a second end away from the opening, wherein the opening extends only partially through the upper portion;

a traction surface having a core element comprising a cylindrical post extending upwardly from the traction surface; and a hollow cushion ring filled with a gas;

wherein:

the first end of the upper portion is spaced apart from the second end thereby defining a midsection, wherein the midsection does not contact the cushion ring;

the cylindrical post is adhered to the upper portion post thereby defining a space between the second end of the upper portion and the traction surface; and the cushion ring is positioned in the space.

2. The foot of claim 1, wherein an outer wall of each of the upper portion post and the cylindrical post is concave.

3. The foot of claim 2, wherein each of the upper portion post and the cylindrical post extends partially through an opening in the cushion ring such that a convex inside wall of the cushion ring is adjacent the concave outer wall of the upper portion post and the cylindrical post.

4. The foot of claim 1, wherein the cylindrical post is hollow.

5. The foot of claim 1, further comprising a plate element positioned between the core element and the upper portion.

6. The foot of claim 1, wherein the traction surface comprises a tread pattern configured to disperse water away from the foot thereby increasing traction of the foot against a ground surface.

7. The foot of claim 1, wherein the opening comprises a plurality of ribs defined at least partially along a vertical length of the opening.

8. The foot of claim 1, wherein the medical mobility device is a crutch, a walker, or a cane.

9. The foot of claim 1, wherein the gas is air or nitrogen.

10. The foot of claim 1, wherein the upper portion comprises plastic or rubber.

11. The foot of claim 10, wherein the traction surface comprises rubber or polyurethane.

12. A cushion system for a medical mobility device, comprising:

an upper portion, comprising a top surface defining an opening, a base surface spaced apart from the top surface, and a mid-section defined between the top surface and the base surface;

a bottom portion, comprising a top surface and a base surface;

a post; and an air-filled cushion secured between the upper portion and the bottom portion and around the post, wherein:

at least a portion of the base surface of the upper portion rests atop at least a portion of the top surface of the bottom portion thereby defining the post;

the post has an arcuately-shaped outer wall thereby defining a ring-shaped area for receiving the air-filled cushion;

the air-filled cushion rests in the ring-shaped area; and the air-filled cushion does not contact the mid-section of the upper portion.

13. The cushion system of claim 12, wherein the post:

is defined within the bottom portion;

forms part of the bottom portion; or is formed by a projection extending from the upper portion and a projection extending from the bottom portion.

14. The cushion system of claim 12, wherein the cushion system is a foot.

15. The cushion system of claim 12, wherein the medical mobility device is a crutch, a walker, or a cane.

16. The cushion system of claim 12, wherein the base surface comprises a tread pattern configured to disperse water away from the foot thereby increasing traction of the foot against a ground surface.

17. A foot for a medical mobility device, comprising:

an upper portion, comprising an opening at a first end for receiving an end of a medical mobility device, and an upper portion post extending from a second end away from the opening, wherein the opening extends only partially through the upper portion;

a traction surface having a core element comprising a cylindrical post extending upwardly from the traction surface; and a cushion ring;

wherein:

the first end of the upper portion is spaced apart from the second end thereby defining a midsection, wherein the midsection does not contact the cushion ring;

the cylindrical post is adhered to the upper portion post thereby defining a space between the second end of the upper portion and the traction surface;

the cushion ring is positioned in the space; and the cushion ring comprises a foam.

18. The foot of claim 17, wherein the medical mobility device is a crutch, a walker, or a cane.

19. The foot of claim 17, wherein the traction surface comprises a tread pattern configured to disperse water away from the foot thereby increasing traction of the foot against a ground surface.

20. The foot of claim 17, wherein an outer wall of each of the upper portion post and the cylindrical post is concave.

* * * * *